United States Patent [19]

Minerd

[11] Patent Number: 4,605,094
[45] Date of Patent: Aug. 12, 1986

[54] COMBINATION TREE SEAT AND ANIMAL DRAG

[76] Inventor: Richard A. Minerd, R.D. #1, Box 223, LeMont Furnace, Pa. 15456

[21] Appl. No.: 792,849

[22] Filed: Oct. 30, 1985

[51] Int. Cl.$^4$ .................. A01M 31/02; A45F 32/26
[52] U.S. Cl. ................................ 182/20; 182/129; 182/187; 108/152
[58] Field of Search ............... 182/187, 188, 134, 135, 182/129; 108/152

[56] References Cited

U.S. PATENT DOCUMENTS

| | | | |
|---|---|---|---|
| 2,879,830 | 3/1959 | Johnson | 182/187 |
| 3,065,821 | 11/1962 | Hundley, Jr. | 182/187 |
| 3,241,734 | 3/1966 | Gray | 182/187 |
| 3,352,379 | 11/1967 | Riggs | 182/20 |
| 3,368,725 | 2/1968 | Martin | 182/187 |
| 3,392,802 | 7/1968 | Moore | 182/187 |
| 3,719,252 | 3/1973 | Tiley | 182/187 |
| 3,990,537 | 11/1976 | Swenson | 182/187 |
| 4,022,292 | 5/1977 | van Gompel | 182/187 |
| 4,230,203 | 10/1980 | Sweat et al. | 182/187 |
| 4,549,635 | 10/1985 | Early | 182/187 |

Primary Examiner—Reinaldo P. Machado
Attorney, Agent, or Firm—Webb, Burden, Robinson & Webb

[57] ABSTRACT

A combination tree seat and animal drag device includes an elongated central support having a first end and a second end and an elongated cross support attached to the first end of said central support and extending approximately transverse thereto. The central support and cross support together form a substantially T-shaped frame member. A seat member is removably attached to a planar surface of said frame member. Tree grip means are provided on the second end of said central support. An elongated strap is removably attached at each end thereof to an attachment means at the ends of the cross support. The frame member may be attached to a tree by engaging the grip means on the central support with an outer surface of the tree and passing the strap around the tree and attaching the strap to the attachment means on the cross support.

11 Claims, 13 Drawing Figures

COMBINATION TREE SEAT AND ANIMAL DRAG

BACKGROUND OF THE INVENTION (1) Field of the Invention

This invention relates to a portable device which can be attached to a tree and form a seat and which can also be used to drag a heavy animal out of the field.

(2) Description of the Prior Art

The use of portable tree stands or tree seats by hunters and the like is well established. Such devices are usually portable and are mounted and demounted to the trunk of a reasonably sized tree. Tree seats provide a support means which enable a hunter to remain relatively motionless, either at ground level or higher, while awaiting the approach of a deer or other animal. Examples of known prior art devices are shown in U.S. Pat. Nos. 4,022,292; 3,368,725; 3,352,379; 3,241,734; and 3,065,821. These devices are not easy to use and are relatively expensive due to the complexity of the device and the number of elements included. These devices are also awkward to use and too heavy to carry for any long distance. U.S. Pat. No. 3,990,537 discloses a relatively simple tree stand, but since it includes a threaded spike which is driven deeply into a tree, this device may injure a tree and its use may be restricted in many states.

Some of the known tree seats have another substantial use. The devices shown in U.S. Pat. Nos. 3,241,734 and 3,368,725 also function as a pack frame. The device shown in U.S. Pat. No. 3,352,379 can be converted into a game cart. However, the latter device requires that a pair of saplings be cut down and secured thereto and is rather complicated and unwieldy to use.

Accordingly, it is an object of the present invention to provide a portable tree seat which is simple in construction, easy to mount and demount, convenient to carry, and secure when mounted.

It is another object of the present invention to provide a tree seat which is adjustable for varied tree diameters but will not harm the tree trunk.

It is a further object of the present invention to provide a tree seat which can be easily used to drag a large animal out of the woods and which also has other substantial uses.

It is yet another object of the present invention to provide such a device which is lightweight, inexpensive and easy to manufacture.

SUMMARY OF THE INVENTION

Accordingly, I have invented a combination tree seat and animal drag device which includes an elongated central support having a first end and a second end and an elongated cross support attached to the first end of the center support and extending approximately transverse thereto. The central support and cross support together form a substantially T-shaped frame member. A seat is removably attached to a planar surface of the frame member. The second end of the central support includes a tree grip means on the second end of the central support. The device includes an elongated strap removably attached at each end to an attachment means at the ends of the cross support. In a preferred embodiment, the central support is hollow and is open at the second end and includes a removable plug for closing the open end of the central support. The tree grip means is ideally formed from serrating a part of the second end of the central support, preferably along an upper edge thereof, to form a plurality of gripping teeth.

The attachment means on the cross support is preferably a single slot at each end. The strap may be securely fastened to one end of the cross support and removably attached to a second end of the cross support. In order to aid the carrying of the device, a lower surface of the central support includes a belt clip adjacent the first end thereof. The strap may carry a frictional engagement means, such as a flat plate slidably mounted on the strap and having a plurality of outwardly projecting teeth on a surface thereof. In this manner, the strap may be more securely connected to an outer surface of the tree. In another embodiment, the device includes a flashlight built within the central support and directly outwardly at the second end of the central support.

DESCRIPTION OF THE PREFERRED EMBODIMENTS

Figure 1:
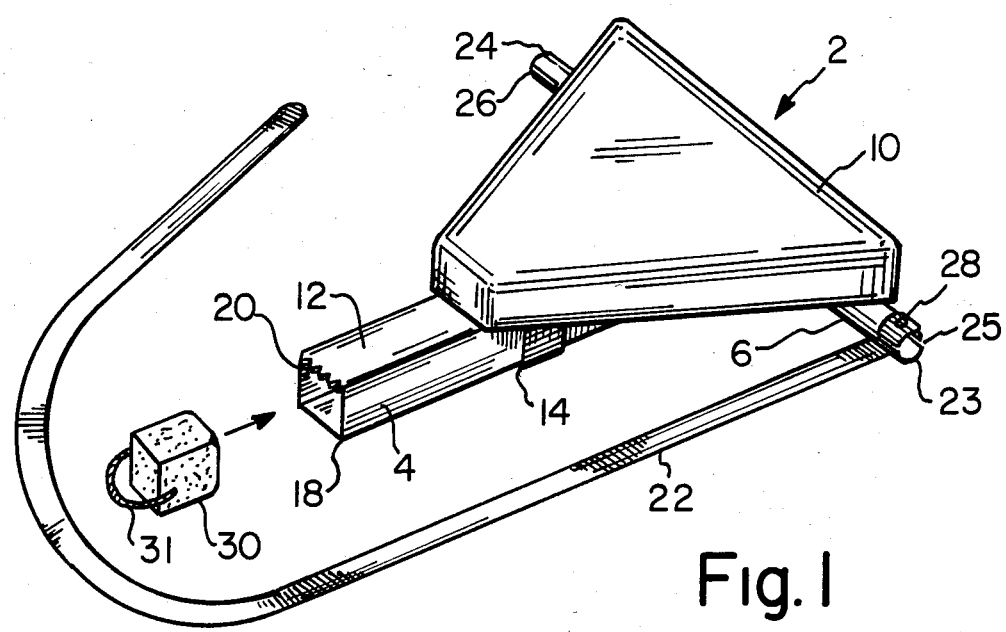
FIG. 1 is a perspective view of a first embodiment of a combination tree seat and animal drag device in accordance with the present invention with the plug being inserted into the open end.
Figure 2:
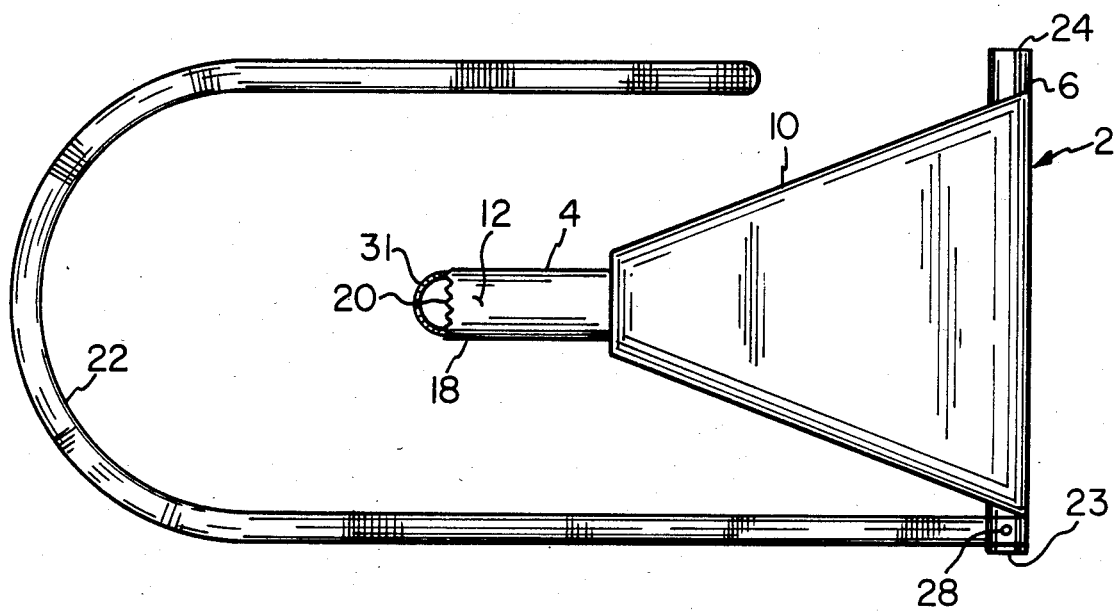
FIG. 2 is a top view of the device shown in FIG. 1 with the plug in place.
Figure 3:
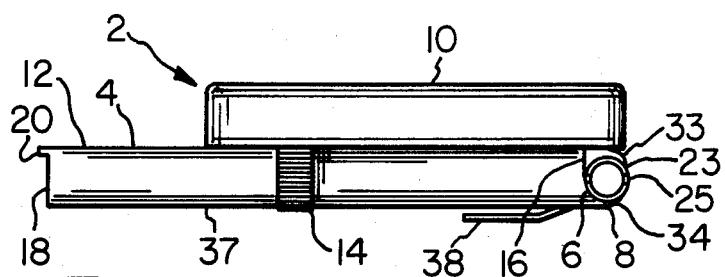
FIG. 3 is a side view of the device shown in FIG. 1 with the strap and plug removed.
Figure 4:
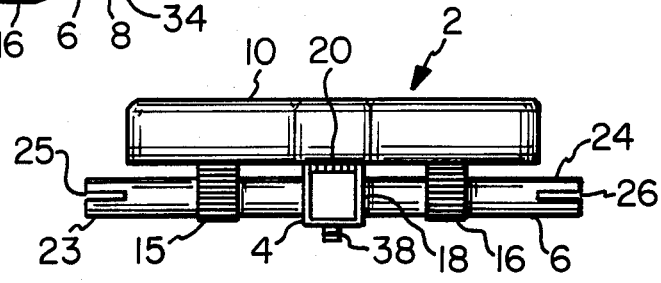
FIG. 4 is a front view of the device shown in FIG. 1 with the strap and plug removed.
Figure 5:
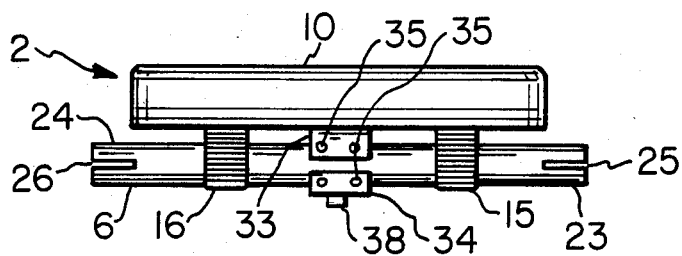
FIG. 5 is a rear view of the device shown in FIG. 1 with the strap and plug removed.
Figure 6:
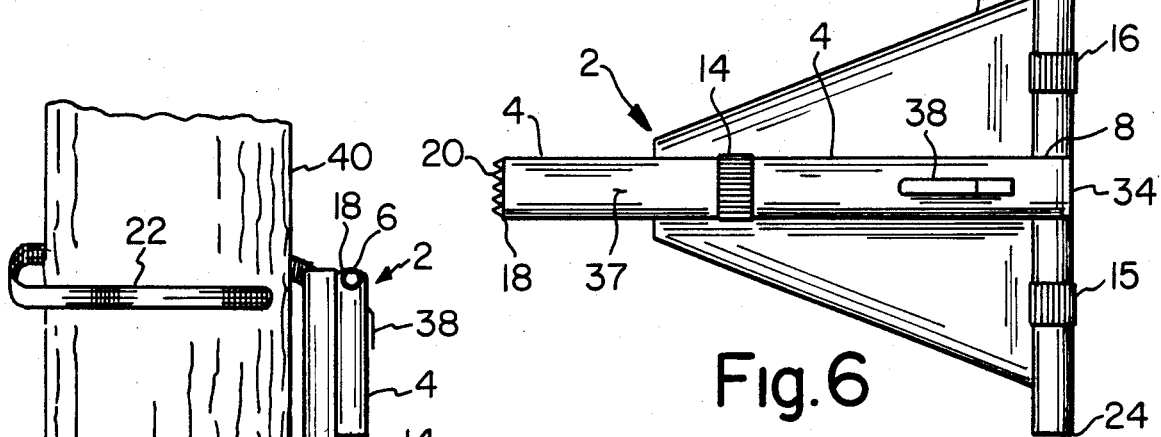
FIG. 6 is a bottom view of the device shown in FIG. 1 with the strap and plug removed.

One embodiment of a combination tree seat and animal drag device 2 in accordance with the present invention is shown in FIGS. 1–6. The device 2 includes an elongated central support 4 and an elongated cross support 6 attached to a first end 8 of the central support 4. Central support 4 and cross support 6 are joined together at about the midpoint of cross support 6 and cross support 6 extends approximtely transversely thereto beyond central support 4. Together the central support 4 and cross support 6 form a substantially I-shaped frame member.

A seat 10 is removably attached to an upper planar surface of the frame member formed by central support 4 and cross support 6. As shown in the first embodiment of the device 2, the seat 10 is supported by and rests directly on the upper planar surface 12 of central support 4. The seat 10 is spaced a short distance above cross support 6 due to the size of cross support 6, but since seat 10 is preferably made of a soft foam, the seat 10 will come into contact with and also be supported by cross support 6 when the device 2 is in use. The seat 10 is connected to central support 4 by elastic band 14 and to cross support 6 by a pair of elastic bands 15 and 16. Other means for removably attaching seat 10 to central support 4 and cross support 6 may be used, such as a hook and loop closure (e.g., Velcro ®), snaps, and the like.

A second end 18 of central support 4, the end furthermost from cross support 6, includes a tree grip means which enables second end 4 to securely engage the outer surface of a tree trunk. In the embodiment of the device 2 shown in FIGS. 1-6, the second end 18 is serrated, preferably only along the upper surface 12 of central support 4, to form a plurality of gripping teeth 20 directed outwardly therefrom.

The device 2 also includes an elongated strap 22 which is attached either permanently or removably to each end 23, 24 of cross support 6 by an attachment means. In the device 2 shown in FIGS. 1-6, the first end 23 of cross support 6 includes a slot 25 therethrough and the second and 24 of cross support 6 includes a similar slot 26 therethrough. Slots 25 and 26 are adapted to engage the strap 22 and fasten it securely to cross support 6. In a preferred embodiment, one end of strap 22 is looped through one of the slots, as shown, slot 25, and securely fastened to cross support 6 by a rivet 28 or the like. The other end of strap 22 can be removably attached to slot 26 in a manner to be explained hereinafter.

In order to make device 2 lightweight and versatile, it is preferred that central support 4 be hollow and open at the second end 18. Various items needed by a hunter, such as matches, tissue, food and the like may be carried within and kept dry by central support 4. The opening at the second end 18 may be closed by a removable plug 30. Plug 30 may be formed from a flexible foam material with a string handle 31 for ease of removal.

It is preferred that cross support 6 be made as a hollow, cylindrical tube, both to make device 2 lightweight but also to make cross support 6 easy to grasp by a user's hand. While cross support 6 is shown as a straight tube, it may also be formed in other configurations, such as an arcuate shape with ends 23 and 24 bent inward toward the second end 18 of the central support 2. The outer surface of cross support 6 may be formed appropriately or coated with a frictional material to aid in gripping the cross support 6. The first end 8 of central support 4 may be formed in a pair of outwardly directed flanges 33 and 34 which are bent around cross support 6 and joined thereto by a plurality of rivets 35. Other arrangements for joining together central support 4 and cross support 6 into a unitary frame member can be utilized.

To aid in carrying device 2 into the woods and the like, a lower surface 37 of central support 4 may be provided with a belt clip 38 adjacent the first end 8 of central support 4 and near cross support 6.

Figures 7, 8:
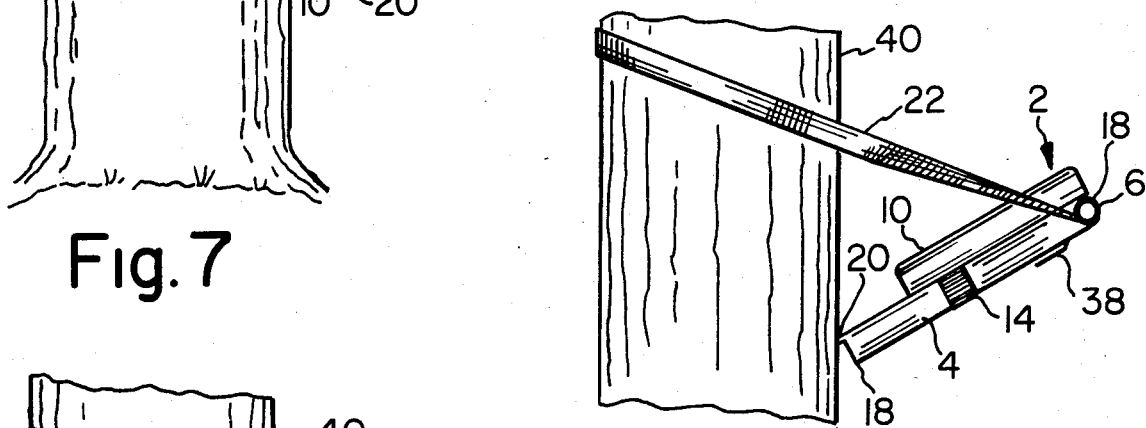
FIG. 7 is a side view of the device shown in FIG. 1 placed adjacent a tree.
FIG. 8 is a side view of the device shown in FIG. 1 being attached to a tree.
Figure 9:
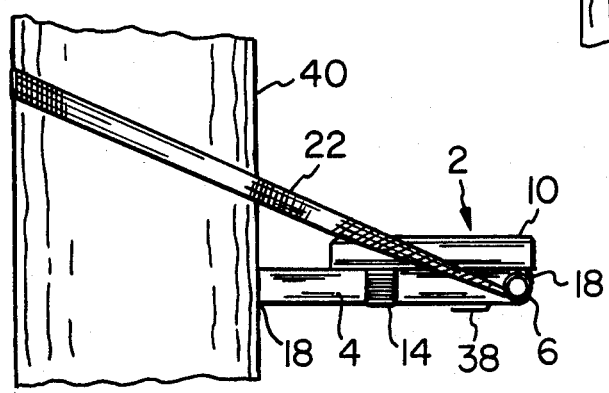
FIG. 9 is a side view of the device shown in FIG. 1 finally installed on a tree.

The installation of device 2 onto the trunk of a tree 40 is shown sequentially with reference to FIGS. 7-9. Initially (see FIG. 7), device 2 is positioned with seat 10 parallel with and adjacent the tree 40. The second end 18 of the central support 4 is positioned at approximately the desired final height of the device 2 above the ground. The strap 22 is wrapped around the tree 40 at about the level of the cross support 6. At this point, the strap 22 is only affixed to one end of cross support 6. Next (FIG. 8), the gripping teeth 20 of central support 4 are placed in contact with the tree 40 and the device 2 is pivoted about the second end 18 of central support 4 moving the first end 8 of central support 4 toward the ground. In an intermediate position, as shown in FIG. 8, the free end of strap 22 is fastened to the other end of cross support 6, all the while maintaining the contact between the tree 40 and the strap 22 at the same level. The gripping teeth 20 are then pushed completely into the tree 40 and the device 2 is pivoted toward the ground until the second end 18 of the central support 4 contacts the tree 40 and prevents any further downward movement. (FIG. 9.) This last motion also tensions the strap 22 so that the device 2 is securely fastened to the tree 40 without slipping. The device 2 is now ready to be used with seat 10 substantially parallel with the ground. To remove the device 2, the above steps are repeated in reverse order.

Figure 10:
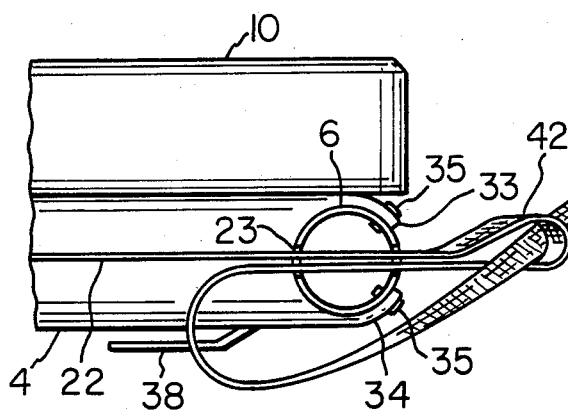
FIG. 10 is a side view of a portion of the device shown in FIG. 1 with the strap being installed on the cross support.

The use of one of the slots on the cross support 6 to releasably secure the strap 22 thereto is shown in FIG. 10. A loop 42 is formed in the strap 22 near one free end 43 and a double layer of strap 22 forming the loop 42 is placed through slot 23 with the loop 42 oriented outwardly therefrom. The free end 43 of the strap 22 is then passed through loop 42. The strap 22 is then tightened and the strap 22 passing through loop 42 keeps the loop 42 from being pulled through slot 23. The strap 22 can be quickly removed by pulling the free end 43 out of loop 42 and removing the strap 22 from the slot 23.

Figure 11:
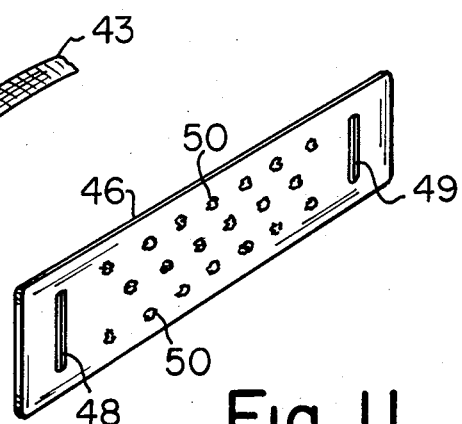
FIG. 11 is a perspective view of a frictional engagement device.
Figure 13:
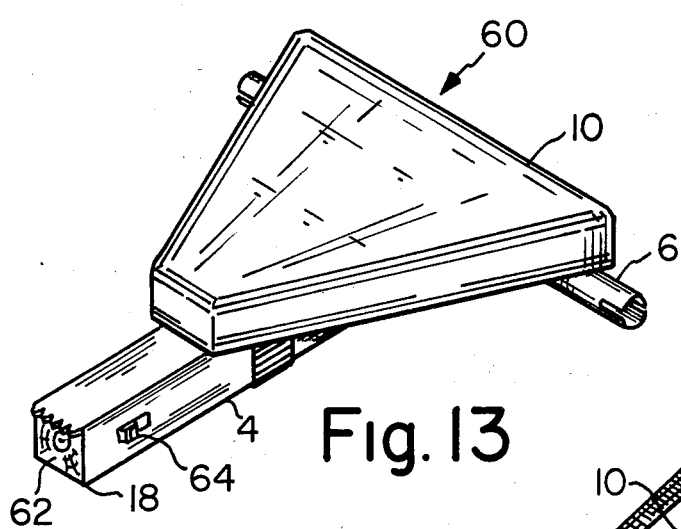
FIG. 13 is a perspective view of a second embodiment of a combination tree seat and animal drag device in accordance with the present invention with the strap removed.

Generally, the frictional engagement between the trunk of the tree 40 and the strap 22 will hold the strap 22 in position. Placing the strap 22 above a branch or other protrusion in the tree will also help to keep the device 2 securely mounted in place. However, the particular tree selected may be too smooth or slippery (i.e., from mold and the like) to create sufficient frictional engagement with a strap 22. In that event, the strap 22 may be provided with a frictional engagement device to securely connect the strap 22 to a tree trunk and prevent slippage. One example of such a frictional engagement device 46 is shown in FIG. 11. Device 46 is an elongated plate which has a pair of spaced mounting slots 48, 49 through which the strap 22 is passed. One surface of the frictional engagement device 46 has a plurality of outwardly projecting teeth 50. The other surface of device 46 (not visible in FIG. 11) is preferably smooth and comes in contact with the strap 22. Device 46 is positioned at the point of contact between the tree and the strap 22. Device 46 is thin and relatively flexible so that it can conform to the curved surface of the tree.

Figure 12:
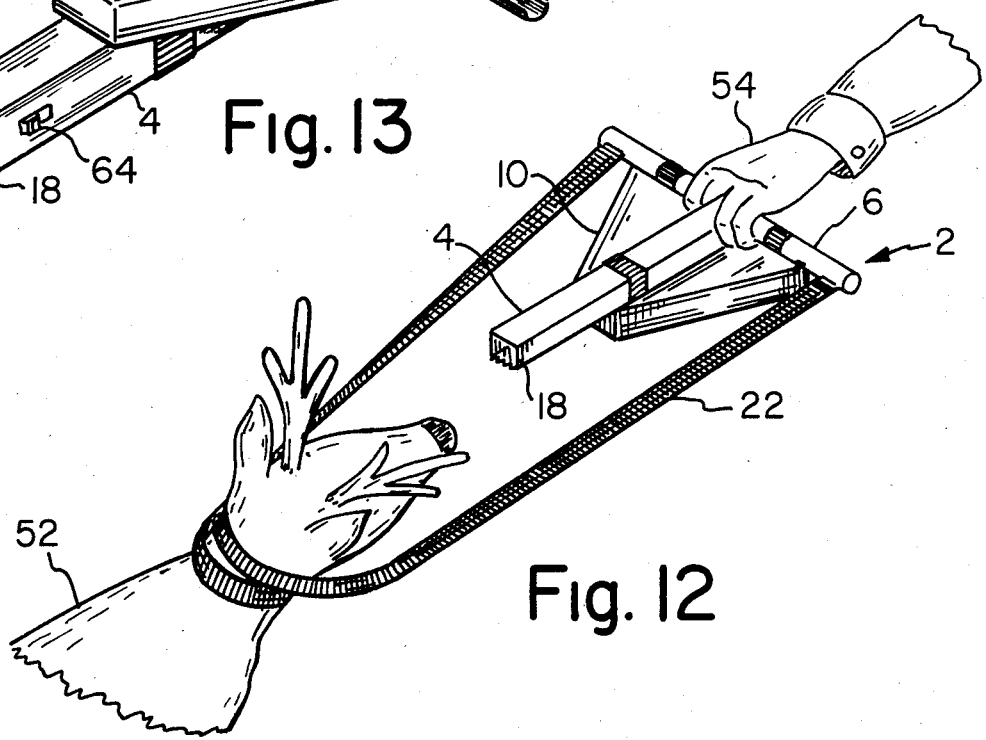
FIG. 12 is a perspective view of the device shown in FIG. 1 with the strap attached to a deer.

The device 2 discussed above may also be easily used to drag a heavy animal out of the woods. As shown in FIG. 12, device 2 is positioned with the second end 18 of central support 4 oriented toward a deer 52. The strap 22 is securely wrapped around the deer's neck and the ends of strap 22 are fastened to the cross support 6. The framework formed by central support 4 and cross support 6, forms a handle which may be easily grasped by a hunter's hand 54. The deer 52 may then be easily and comfortably dragged out of the woods. The seat 10 may be removed while device 2 is used to drag an animal or it may be left in place on the frame as shown in FIG. 12.

A second embodiment of a tree seat and animal drag device 60 in accordance with the present invention is shown in FIG. 12 with the strap removed. Device 60 is very similar to device 2 discussed above and only the additional features will be identified. In device 60, the interior of central support 4 is provided with a flashlight 62 having the bulb end located and directed outward at the second end 18 thereof. The flashlight 62 is controlled by an on-off switch 64 on an outer surface of the central support 4. Device 60 is particularly useful when a hunter enters the woods well before sunrise in order to select a favorable hunting position. By building a flashlight 62 directly into device 60, the hunter need not carry a separate flashlight.

The central support 4 and cross support 6 are ideally hollow and made from aluminum which is strong yet lightweight and does not corrode. The seat is preferably a lightweight foam covered with a sturdy vinyl or the like. The device may be painted with a bright orange color or the like so that the user is visible to other hunters.

Having described hereinabove the preferred embodiments of the present invention, it is to be understood that the invention may be otherwise embodied within the scope of the appended claims.

I claim:

1. A combination tree seat and animal drag device comprising an elongated central support having a first end and a second end and an elongated cross support attached to said first end of said central support and extending approximately transverse thereto to form a substantially T-shaped frame member, a seat member removably attached to a planar surface of said frame member, tree grip means on said second end of said central support, attachment means on said cross support and an elongated strap removably attached at each end thereof to said attachment means on said cross support, whereby said frame member may be attached to a tree by engaging said tree grip means on said central support with the outer surface of the tree and passing said strap around said tree and attaching said strap to said attachment means on said cross support.

2. The device of claim 1 wherein said central support is hollow and is open at said second end.

3. The device of claim 2 wherein a part of said second end of said central support is serrated to form said tree grip means.

4. The device of claim 3 wherein said second end of said central support is serrated only along the upper edge thereof.

5. The device of claim 1 wherein said attachment means is a slot at each end of said cross support.

6. The device of claim 5 wherein said strap is securely fastened to a first end of said cross support and is removably attached to a second end of said cross support.

7. The device of claim 1 including a belt clip on a lower surface of said central support adjacent said first end of said central support.

8. The device of claim 1 wherein said strap carries a frictional engagement means for securely connecting said strap to the outer surface of a tree.

9. The device of claim 8 wherein said frictional engagement means is a flat plate slidably mounted on said strap and has a plurality of outwardly projecting teeth on a surface thereof.

10. The device of claim 2 further including a removable plug for closing said open end of said central support.

11. The device of claim 2 further including a flashlight within said central support and directed outward at said second end.

* * * * *